US008152878B2

(12) United States Patent
McLeod

(10) Patent No.: US 8,152,878 B2
(45) Date of Patent: Apr. 10, 2012

(54) CYCLONIC SEPARATING APPARATUS

(75) Inventor: David Andrew McLeod, Malmesbury (GB)

(73) Assignee: Dyson Technology Limited, Malmesbury (GB)

( * ) Notice: Subject to any disclaimer, the term of this patent is extended or adjusted under 35 U.S.C. 154(b) by 234 days.

(21) Appl. No.: 12/710,094

(22) Filed: Feb. 22, 2010

(65) Prior Publication Data

US 2010/0218338 A1 Sep. 2, 2010

(30) Foreign Application Priority Data

Feb. 27, 2009 (GB) .................................. 0903408.3

(51) Int. Cl.
*B01D 45/00* (2006.01)

(52) U.S. Cl. ............ 55/343; 55/346; 55/348; 55/459.1; 55/DIG. 3; 55/345; 15/352; 15/353; 15/347

(58) Field of Classification Search .................... 55/343, 55/346, 348, 459.1, DIG. 3
See application file for complete search history.

(56) References Cited

U.S. PATENT DOCUMENTS

| | | | | |
|---|---|---|---|---|
| 7,691,161 | B2 * | 4/2010 | Oh et al. | 55/337 |
| 7,815,703 | B2 * | 10/2010 | Park | 55/343 |
| 2009/0320421 | A1 * | 12/2009 | Qian | 55/441 |

FOREIGN PATENT DOCUMENTS

| | | |
|---|---|---|
| DE | 1 058 470 | 6/1959 |
| EP | 1 268 076 | 10/2004 |
| EP | 1 952 744 | 8/2008 |
| GB | 2 399 780 | 9/2004 |
| GB | 2 426 726 | 12/2006 |
| WO | WO-2006/125945 | 11/2006 |

OTHER PUBLICATIONS

International Search Report and Written Opinion mailed May 26, 2010, directed to International Patent Application No. PCT/GB2010/050243; 11 pages.

GB Search Report directed at application No. GB0903408.3 dated Apr. 23, 2009; 1 page.

* cited by examiner

*Primary Examiner* — Jason M Greene
*Assistant Examiner* — Dung Bui
(74) *Attorney, Agent, or Firm* — Morrison & Foerster LLP

(57) ABSTRACT

Cyclonic separating apparatus for a cleaning appliance such as a vacuum cleaner has a longitudinal axis, an upstream cyclonic separator and a downstream cyclone assembly. The downstream cyclone assembly comprises a plurality of cyclones arranged in parallel with one another. The downstream cyclones are arranged in a first set in which each cyclone has a longitudinal axis inclined at a first angle (α) to the longitudinal axis of the cyclonic separating apparatus and a second set, in which each cyclone has a longitudinal axis inclined at a second angle (β) to the longitudinal axis of the cyclonic separating apparatus. The second angle (β) is greater than the first angle (α). The invention allows the downstream cyclone assembly to be compactly packaged.

23 Claims, 8 Drawing Sheets

CYCLONIC SEPARATING APPARATUS

REFERENCE TO RELATED APPLICATIONS

This application claims the priority of United Kingdom Application No. 0903408.3, filed 27 Feb. 2009, the entire contents of which are incorporated herein by reference.

FIELD OF THE INVENTION

The present invention relates to cyclonic separating apparatus for separating particles from a fluid flow, such as is employed in, for example, a vacuum cleaner.

BACKGROUND OF THE INVENTION

Vacuum cleaners which utilise cyclonic separators are known. In a typical cyclonic vacuum cleaner, an airflow in which dirt and dust is entrained enters a first cyclonic separator via a tangential inlet which causes the airflow to follow a spiral or helical path within a collecting chamber. Centrifugal forces act on the entrained dirt to separate the dirt from the flow. Relatively clean air passes out of the chamber whilst the separated dirt and dust is collected therein. In some appliances, the airflow is then passed to a second cyclonic separator stage which is capable of separating finer dirt and dust than the first cyclonic separator. An example of such an arrangement is shown in EP1268076, in which a plurality of cyclones work in parallel within the cyclonic separator. Each individual cyclone is small in comparison to that used in an equivalent single cyclone apparatus. The relatively small size of each individual cyclone has the effect of increasing the centrifugal force acting on particles entrained in the airflow passing through the cyclone body. This increase in the force results in an increase in the separation efficiency of the apparatus. The fine dirt and dust separated by the second cyclonic separator stage is typically also collected in the collecting chamber. The cleaned airflow then exits the collecting chamber.

In domestic vacuum cleaner applications, it is desirable for the appliance to be made as compact as possible without compromising the performance of the appliance. It is also desirable for the efficiency of the separation apparatus contained within the appliance to be as efficient as possible and to separate a high proportion of very fine dust particles from the airflow. A further consideration is that the separation apparatus be simple to manufacture and assemble.

The invention provides cyclonic separating apparatus having a longitudinal axis and comprising an upstream cyclonic separator and a downstream cyclone assembly comprising a plurality of cyclones arranged in parallel with one another in first and second sets, at least some of the cyclones of the first set having a longitudinal axis inclined at a first angle to the longitudinal axis of the cyclonic separating apparatus, and at least some of the cyclones of the second set having a longitudinal axis inclined at a second angle to the longitudinal axis of the cyclonic separating apparatus, the second angle being greater than the first angle.

The arrangement of the invention makes use of the high separation efficiency achievable by a plurality of parallel cyclones whilst also allowing the downstream cyclone assembly to be compactly packaged. The downstream cyclone assembly of the invention occupies a smaller volume than it would if the downstream cyclones were formed with their longitudinal axes substantially parallel. This allows the apparatus to be utilised in an appliance such as a domestic vacuum cleaner.

Preferably, all of the cyclones of the first set have a longitudinal axis inclined at the first angle to the longitudinal axis of the cyclonic separating apparatus. It is also preferable that all of the cyclones of the second set have a longitudinal axis inclined at the second angle to the longitudinal axis of the cyclonic separating apparatus. Such an arrangement makes the cyclonic separating apparatus easy to manufacture and assemble.

Advantageously, the cyclones of the second set at least partially surround the cyclones of the first set, which provides a compact configuration of the downstream cyclone assembly.

Advantageously, at least some of the cyclones of the downstream cyclone assembly have a cap inside the respective cyclone, the cap comprising an inlet to the cyclone. By locating the inlet to the cyclone within the cyclone itself, a more compact arrangement can be made.

Preferably, the cap is a one-piece construction that also includes at least some of the following: a helical channel extending from the inlet to the interior of the cyclone; an outlet for the cyclone; one or more baffles arranged to reduce turbulence in the outgoing airflow. Such a one-piece construction further simplifies manufacture and assembly of the cyclonic separator.

The helical channel can extend in either a first rotational direction (e.g. clockwise) or in the opposite rotational direction (anti-clockwise). Colour coding may be employed so that the assembly line operator can differentiate between caps having a clockwise channel from those having an anticlockwise channel.

The invention further provides a method of manufacturing cyclonic separating apparatus having a longitudinal axis, and a downstream cyclone assembly comprising a plurality of cyclones arranged in parallel with one another, the method comprising; moulding a first component comprising a first set of cyclones, at least some of which have a longitudinal axis inclined at a first angle to the longitudinal axis of the assembled cyclonic separating apparatus; and moulding a second component comprising a second set of cyclones, at least some of which have a longitudinal axis inclined at a second angle to the longitudinal axis of the assembled cyclonic separating apparatus, the second angle being greater than the first angle.

The method of the invention allows a more complex downstream cyclone assembly to be manufactured than was possible hitherto, making it possible for a more compact arrangement to be achieved.

The invention will now be described, by way of example, with reference to the accompanying drawings, in which:

DETAILED DESCRIPTION OF THE INVENTION

Figure 1:
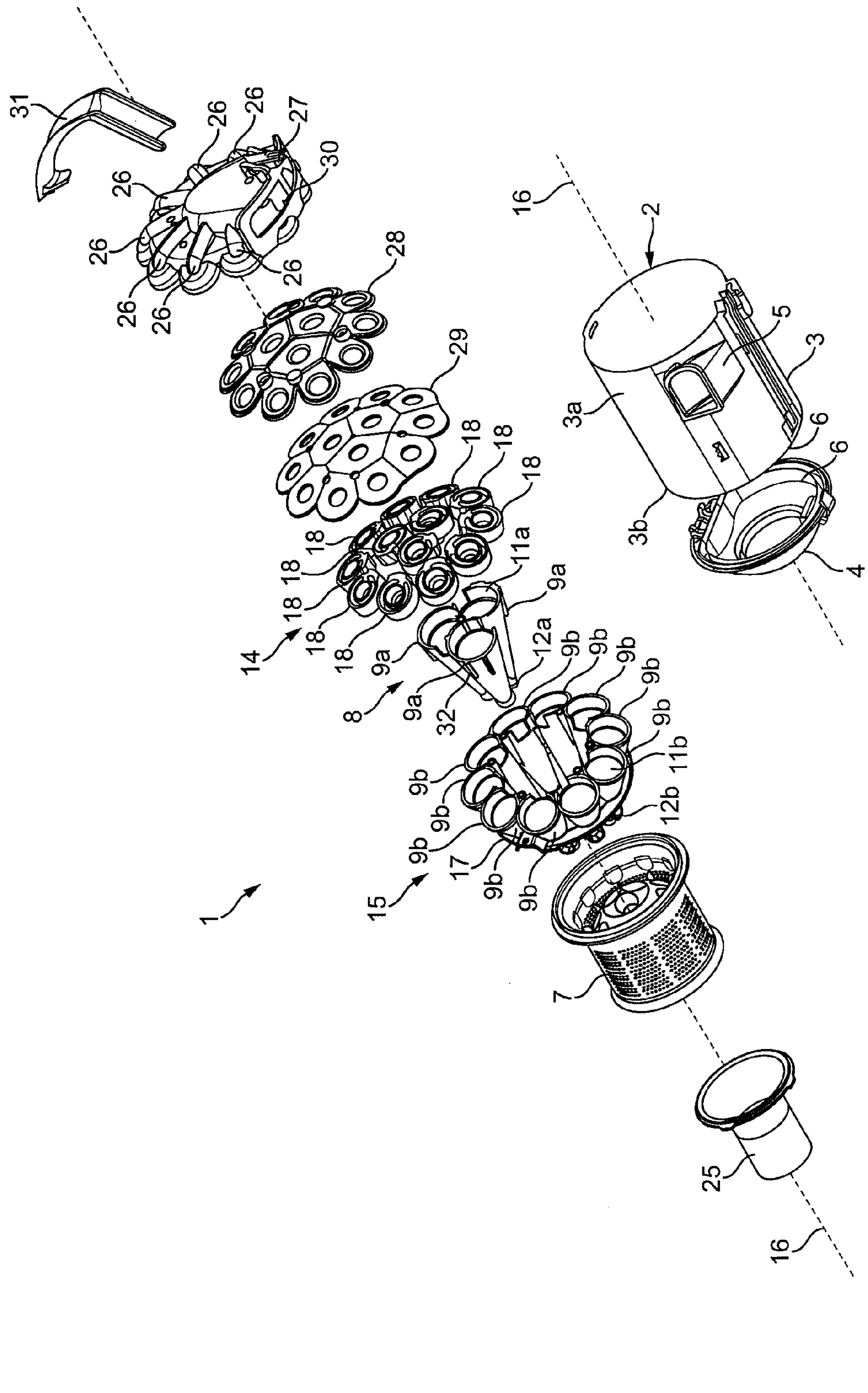
FIG. 1 is an exploded view of cyclonic separating apparatus constructed according to the invention.

Like reference numerals refer to like parts throughout the specification.

Figure 2:
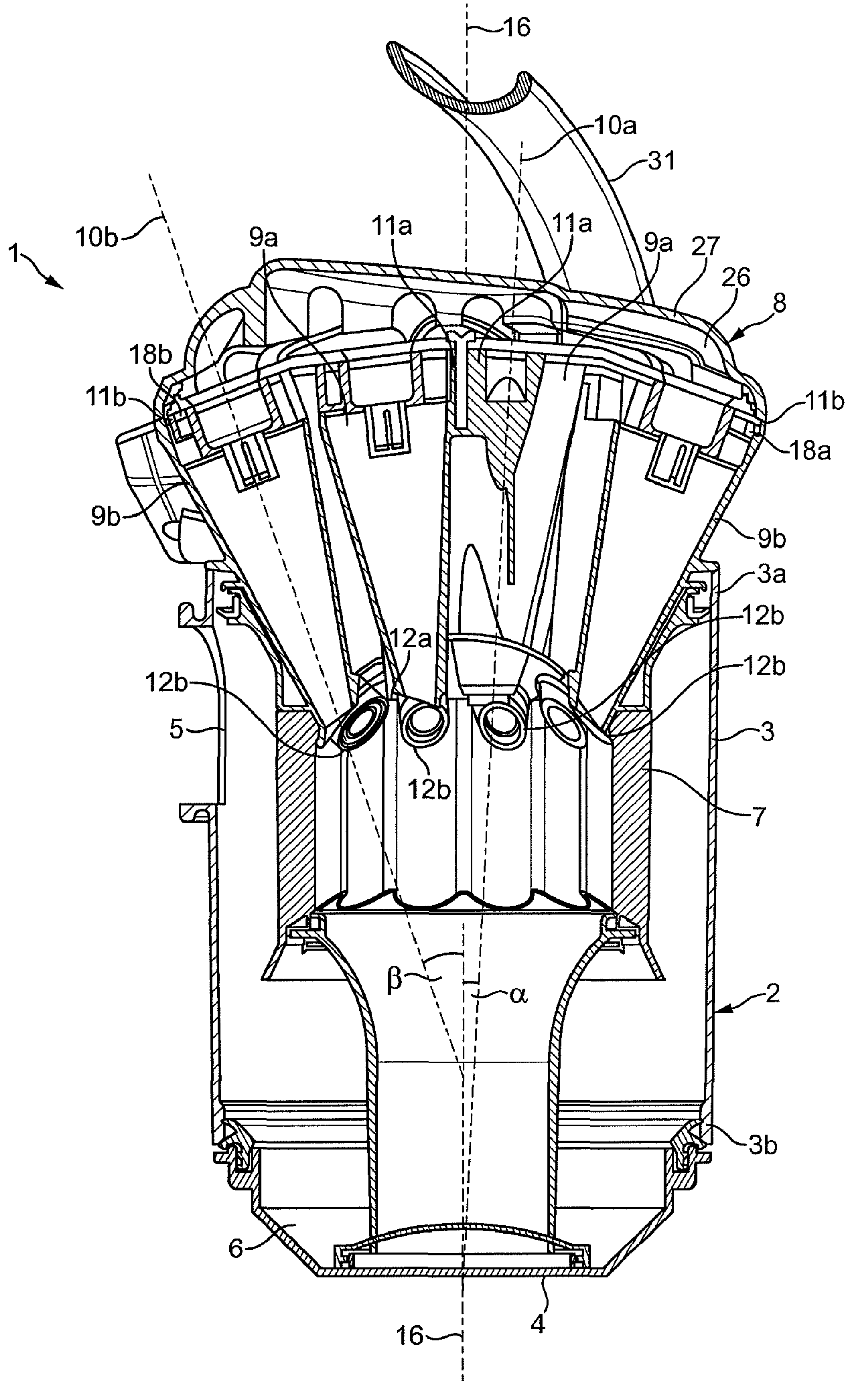
FIG. 2 is a sectional side view of the cyclonic separating apparatus of FIG. 1.

With reference to FIG. 1, a cyclonic separating apparatus indicated generally by the reference numeral 1 is shown in exploded view. FIG. 2 is a sectional view of all the elements of the cyclonic separating apparatus 1 as assembled. Certain components, such as fasteners, seals and catches, have been omitted from these drawings for clarity.

The cyclonic separating apparatus 1 comprises an upstream cyclone 2 having a cylindrical side wall 3 and a base 4. A tangential inlet 5 is provided in an upper portion 3*a* of the side wall 3. In use, the tangential inlet 5 delivers particle-laden fluid to the interior of the upstream cyclone 2 in a direction which is tangential to the side wall 3 so as to set up a swirling flow in the interior of the upstream cyclone. This swirling, helical flow causes a proportion of larger particles entrained in the fluid flow to become separated from it. A lower portion 3*b* of the side wall 3 and the base 4 together form a collector 6 for particles, such as dirt and dust separated by the upstream cyclone 2. The base 4 is pivotably attached to the side wall 3. The collector 6 may be emptied of separated particles by a user opening the base 4.

A shroud 7 is located inwardly of the cylindrical side wall 3 of the upstream cyclone 2. The shroud 7 comprises a cylindrical wall having a plurality of through-holes. The shroud 7 provides a communication path between the upstream cyclone 2 and a downstream cyclone assembly 8.

The downstream cyclone assembly 8 comprises a plurality of downstream cyclones 9*a*, 9*b* arranged in parallel. Each downstream cyclone 9*a* comprises a frusto-conical member having a longitudinal axis 10*a* and also having an opening 11*a*, 12*a* at each end.

The opening 11*a* is larger than the opening 12*a*. Each downstream cyclone 9*b* also comprises a frusto-conical member having a longitudinal axis 10*b* and also having an opening 11*b*, 12*b* at each end. The opening 11*b* is larger than the opening 12*b*. In this embodiment, each of the downstream cyclones 9*a*, 9*b* is oriented so that its respective larger opening 11*a*, 11*b* is above its smaller opening 12*a*, 12*b*. Each of the downstream cyclones 9*a*, 9*b* includes a slot 13*a*, 13*b*. The slot 13*a*, 13*b* extends part-way round the diameter of the respective larger opening 11*a*, 11*b*. The internal dimensions of the cyclones 9*a*, 9*b* are substantially the same.

Figure 3B:
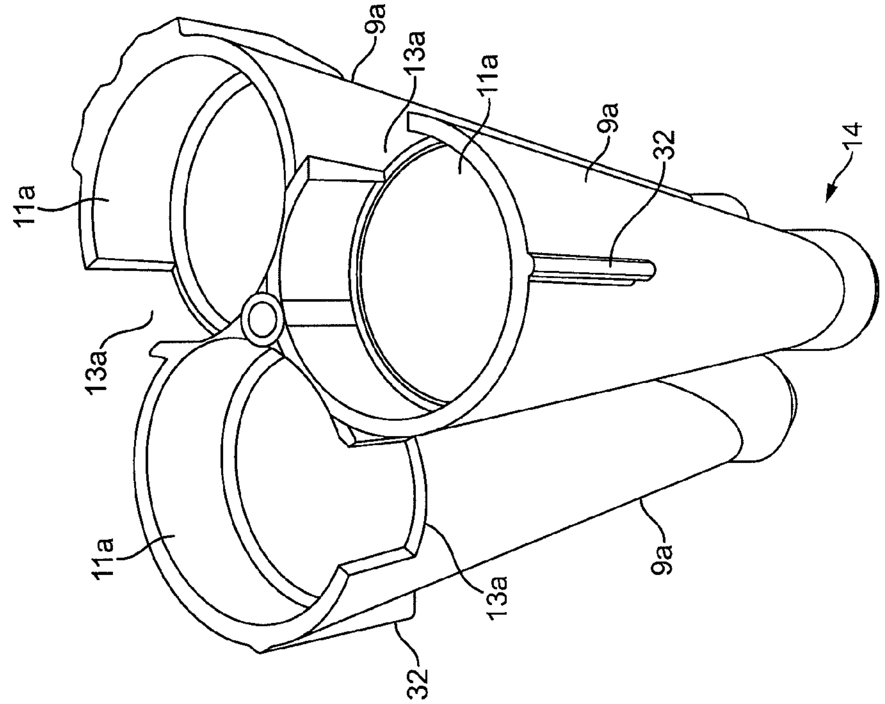
FIG. 3*b* is a perspective view from above of the part of FIG. 3*a;*
Figure 3A:
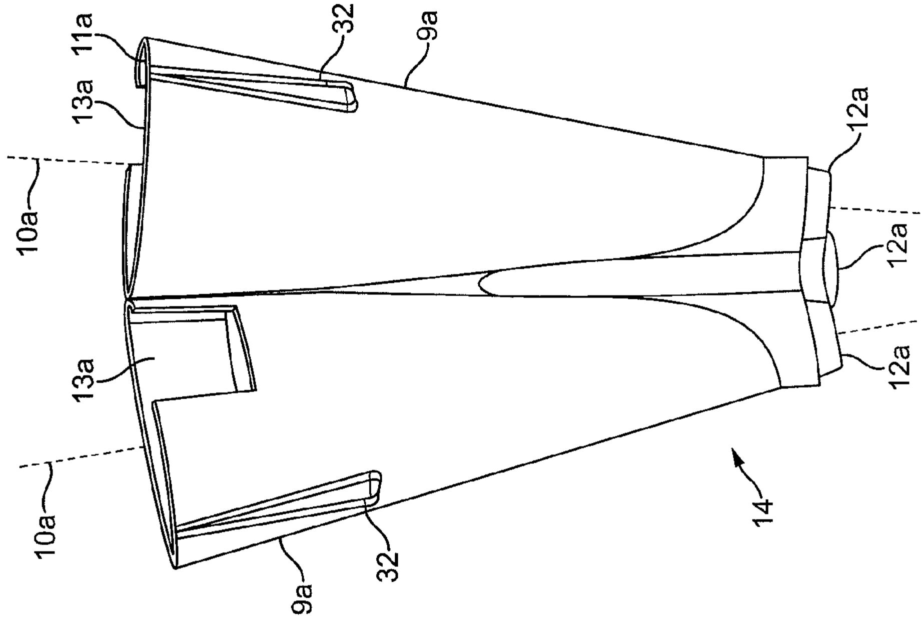
FIG. 3*a* is a side view of part of the cyclonic separating apparatus of FIGS. 1 and 2.

The downstream cyclones 9*a*, 9*b* are arranged in two groups: a first set 14 and a second set 15. The first set 14 is shown in more detail in FIGS. 3*a* and 3*b*. The first set 14 comprises a group of three downstream cyclones 9*a*. The downstream cyclones 9*a* of the first set 14 are arranged in a cluster with their larger openings 11*a* adjacent one another. Each cyclone 9*a* is oriented so that its respective slot 13*a* in its larger opening 11*a* faces away from the centre of the cluster. Each cyclone 9*a* of the first set 14 is tilted so that the smaller openings 12*b* are closer to the centre of the cluster than are the larger openings 11*a*. The longitudinal axes 10*a* converge at a point below the downstream cyclone assembly 8. With reference to FIG. 2, the cyclonic separating apparatus 1, when assembled, has its own longitudinal axis 16. The longitudinal axes 10*a* of the first set 14 of cyclones 9*a* are inclined with respect to the longitudinal axis 16 of the cyclonic separating apparatus by a first angle, α, which is relatively small. In this embodiment, the first angle, α, is approximately 7°. Values of α of between 2° and 15° are appropriate for this embodiment of the cyclonic arrangement.

Figure 4A:
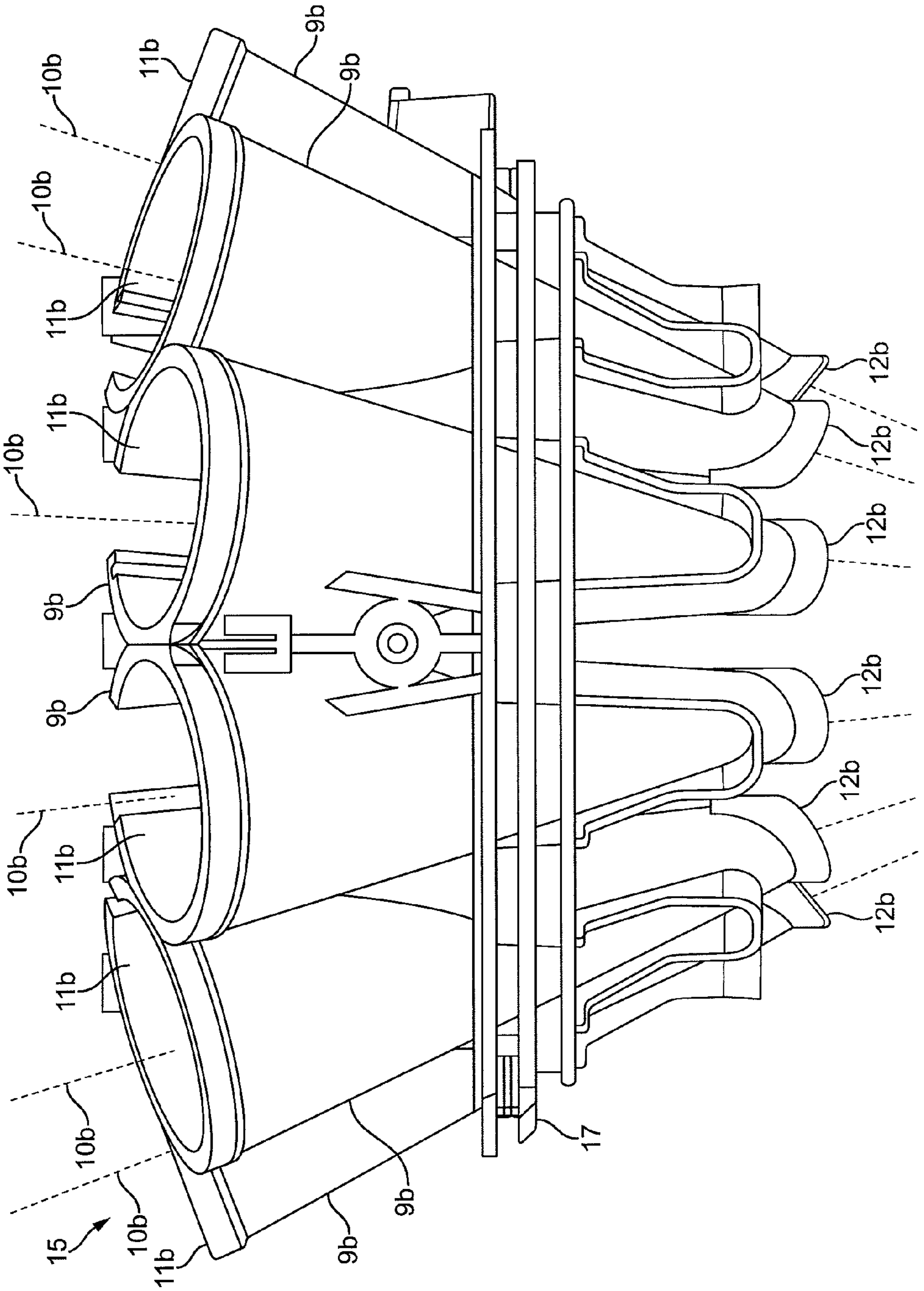
FIG. 4*a* is a side view of another part of the cyclonic separating apparatus of FIGS. 1 and 2.
Figure 4B:
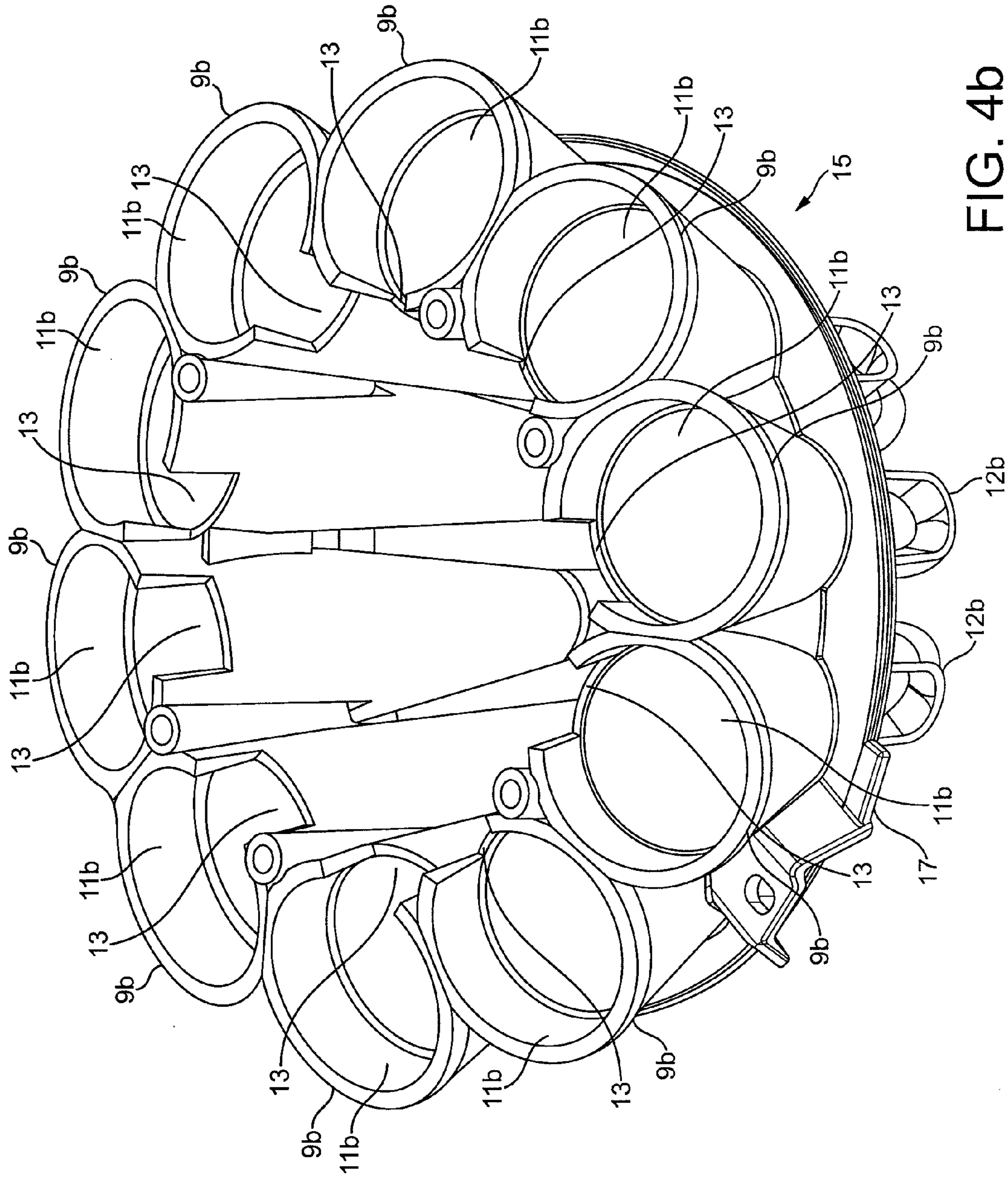
FIG. 4*b* is a perspective view from above of the part of FIG. 4*a;*

The second set 15 comprises a group of ten downstream cyclones 9*b*, and is shown in more detail in FIGS. 4*a* and 4*b*. The downstream cyclones 9*b* of the second set 15 are arranged on the diameter of a circle with their larger openings 11*b* adjacent one another. Each cyclone 9*b* is oriented so that the respective slot 13*b* in its larger opening 11*b* faces radially inwardly. Each cyclone 9*b* of the second set 15 is tilted so that the smaller openings 12*b* are closer to the centre of the circle than are the larger openings 11*b*. The longitudinal axes 10*b* converge at a point below the downstream cyclone assembly 8—but this point is not as low as the point of convergence of the first set 14. The longitudinal axes 10*b* of the second set 15 of cyclones 9*b* are inclined with respect to the longitudinal axis 16 of the cyclonic separating apparatus by a second angle, β, which is larger than the first angle α. In this embodiment, the second angle, β, is approximately 20°. Values of β of between 15° and 45° are appropriate for this embodiment of the cyclonic arrangement.

The second set 15 of downstream cyclones 9*b* is held in this circular arrangement by means of a support ring 17, located part-way along the downstream cyclones 9*b*, between the larger openings 11 and smaller openings 12. The support ring 17 also assists in assembling the cyclonic separating apparatus 1, as will be described later in the specification.

The smaller openings 12*b* of the cyclones 9*b* of the second set 15 are chamfered so that each opening lies in a plane inclined at an angle to the longitudinal axis 16 of the cyclonic separating apparatus 1 so that each cyclone 9*b* has a lowermost portion lying furthest from the respective larger opening 11*b*. This arrangement of the downstream cyclones 9*b* provides a greater effective area of the smaller openings 12*b*, which helps to prevent blockages occurring in the cyclones 9*b*. In this embodiment, the lowermost portion faces radially outwardly of the circle defined by the second set 15 of cyclones 9*b* and towards the side wall 3 of the collector 6.

Figure 5A:
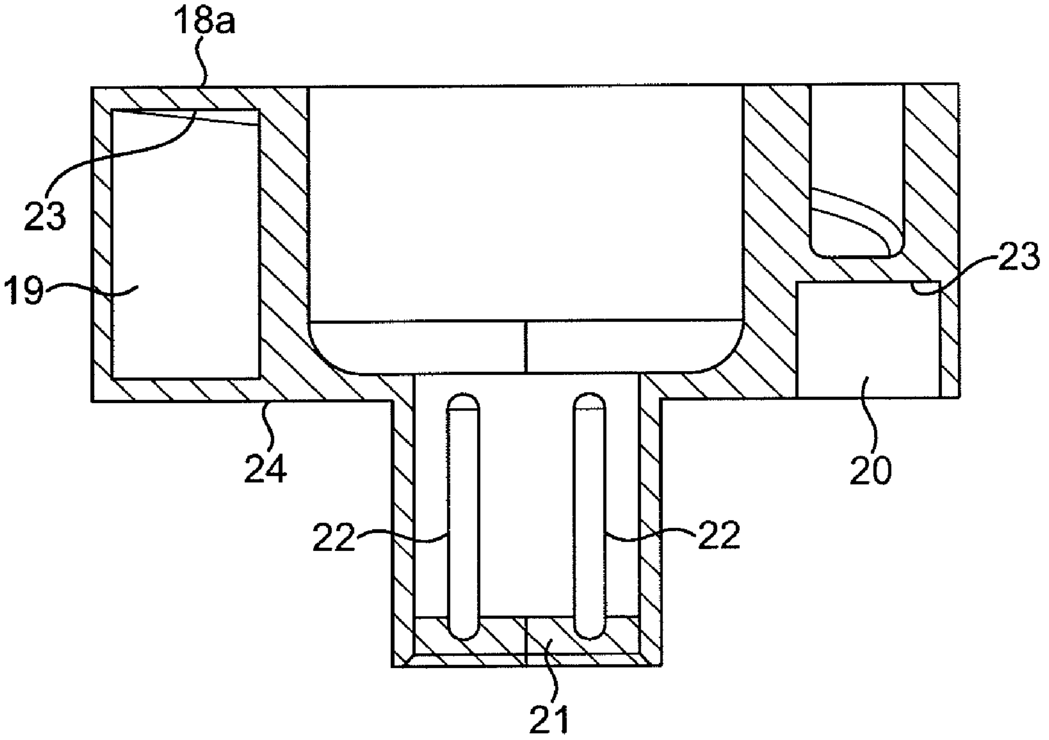
FIG. 5*a* is a sectional side view of another part of the cyclonic separating apparatus of FIGS. 1 and 2.
Figure 5B:
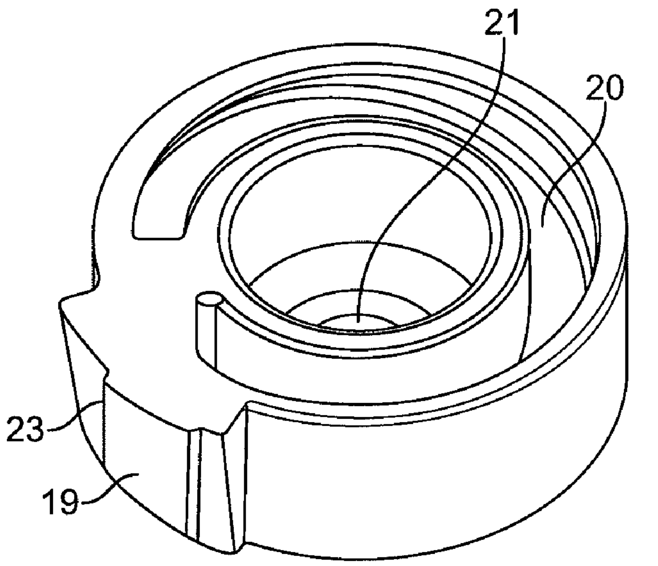
FIG. 5*b* is a perspective view from above of the part of FIG. 5*a;*
Figure 5C:
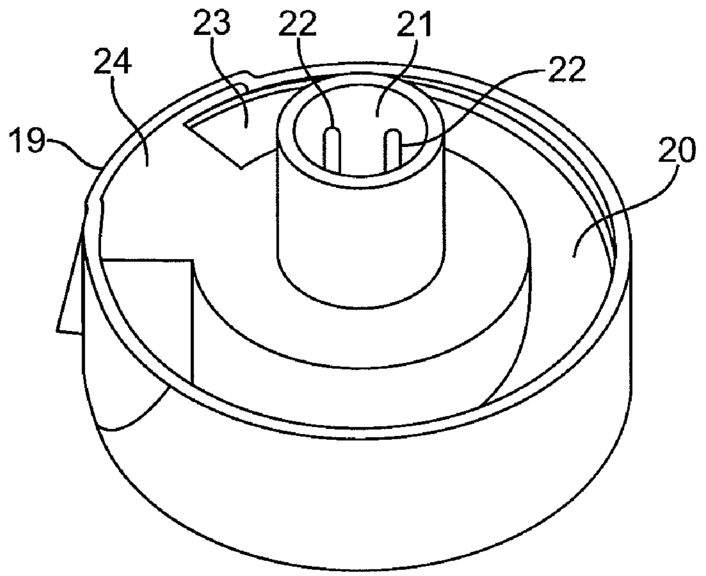
FIG. 5*c* is a perspective view from below of the part of FIGS. 5*a* and 5*b*.

The downstream cyclone assembly 8 further comprises a plurality of caps 18. Each cap is arranged to fit inside respective ones of the downstream cyclones 9*a*, 9*b*. There are two types of cap 18*a*, 18*b*, and a cap of type 18*a* is shown in more detail in FIGS. 5*a*, 5*b* and 5*c*. The cap 18*a* is a one-piece construction that comprises four main features: an inlet 19; a channel 20; an outlet 21; and one or more baffles 22.

The cap 18*a* is predominantly cylindrical in shape, with a mostly circular cross section. The diameter of the circle corresponds to the internal diameter of the larger openings 11*a*, 11*b* of the downstream cyclones 9*a*, 9*b*. The cap 18*a* has a region of enlarged diameter, which comprises the inlet 19. The internal cross-section of the inlet 19 is approximately rectangular. The external dimensions of the inlet 19 correspond to the internal dimensions of the slots 13*a*, 13*b*. When the cyclonic separating apparatus 1 is assembled, the caps 18 fit in respective ones of the downstream cyclones 9*a*, 9*b*, with the inlet 19 of each cap being held in a respective slot 13*a*, 13*b*.

The channel 20 extends from the inlet 19 and follows a helical path within the cap 18*a*, following a circle within the circular cross-section of the cap and extending axially along the cylinder. The cross-section of the channel 20 is approximately rectangular, and its internal dimensions decrease along the length of its helical path. The channel 20 has an upper wall 23; at one end of the channel, this is flush with the interior of the upper wall of the inlet 19; at the other end of the channel, this wall is flush with the bottom surface 24 of the cylindrical portion of the cap 18*a*. In the cap 18*a*, the channel 20 extends in a clockwise direction; in caps of type 18*b*, the channel extends in an anti-clockwise direction.

The outlet 21, which is also sometimes referred to as a vortex finder, extends axially with respect to the cylindrical portion of the cap 18*a* and is coaxial with the centre of the circle defined by the channel 20. The outlet 21 extends from the bottom surface 24 and away from the cylindrical portion of the cap 18*a*. The outlet 21 comprises a tubular member of circular cross-section. The baffles 22 extend along the interior surface of the outlet 21. The baffles 22 are equally spaced around the internal circumference of the outlet 21 and extend axially along it. The radial dimension of the baffles 22 is relatively small. In use, the baffles 22 help to straighten the spiralling airflow as it exits the downstream cyclone 9*a*, 9*b*, which usefully recovers pressure in the apparatus.

When the cyclonic separating apparatus 1 is assembled, each downstream cyclone 9*a*, 9*b* of the downstream cyclone assembly 8 is in communication with a downstream collector 25 in the collector 6. The downstream collector 25 comprises a cylindrical wall located inwardly of, and underneath the shroud 7. Airflow from the shroud 7 enters the downstream cyclones 9*a*, 9*b* via the respective inlets 19. The helical channels 20 impart a swirling flow to the incoming air. Each of the downstream cyclones 9*a*, 9*b* has a diameter smaller than that of the upstream cyclone 2. Therefore, the downstream cyclone assembly 8 is, in use, able to separate smaller particles of dirt and dust from the partially-cleaned airflow than the upstream cyclone 2. Separated dirt and dust exits the downstream cyclone assembly 8 and passes into the downstream collector 6. Cleaned air then flows back up through the downstream cyclones 9*a*, 9*b* and through the cyclone outlets 21.

The cleaned airflow then enters cyclone outlet ducts 26 formed in a cyclone cover 27, which fits over a lid 28 and seal 29 on the downstream cyclone assembly 8. The cyclone outlet ducts 26 form part of the outer surface of the cyclonic separating apparatus 1. The airflows from the separate cyclone outlet ducts 26 is combined in the cyclone cover 27 into one airflow, which exits the cyclonic separating apparatus 1 via an outlet 30.

A handle 31 is located on the lid of the downstream cyclone assembly 8 and is arranged to allow a user to carry the cyclonic separating apparatus 1. The user can then place the cyclonic separating apparatus 1 over a suitable dirt and dust receptacle, such as a dustbin, and then open the base 4 in order to empty particles of dirt and dust that have been collected in the collectors 6 and 25.

The downstream cyclone assembly 8 of the invention occupies a smaller volume than it would if the downstream cyclones were formed with their longitudinal axes substantially parallel. Although such a compact arrangement is desirable, it had previously been thought not easy to achieve in practice because of several complexities:

- Conventionally, the entire arrangement of downstream cyclones is moulded as one piece of plastic. However, the cyclone arrangement of the present invention comprises cyclones located close together, oriented at different axes and converging at different points, which is difficult to make as one piece using normal industrial plastics moulding processes. In order to get around the difficulty of manufacturing such a complex component, each downstream cyclone 9*a*, 9*b* is a simple frusto-conical member, and each set 14, 15 of such cyclones is made as one piece. The sets 14, 15 of cyclones are designed to easily slot together during assembly, as discussed below.
- Conventionally, the inlets of the downstream cyclones comprise conduits moulded on top of the larger openings of the cyclones. The outlets, or vortex finders, for the entire downstream cyclone assembly are made as one piece, in the form of a cap mounted over the inlet conduits. However, such an arrangement occupies a relatively large volume, making the cyclone assembly less compact. The caps 18 of the present invention—each of which encapsulates an inlet, flow channel, outlet and baffles—sit inside each of the downstream cyclones 9*a*, 9*b* and so do not add to the overall volume of the cyclone assembly. Furthermore, this arrangement automatically provides good registration and a sound seal between the inlets and outlets and their respective cyclones.

The invention also permits the downstream cyclone assembly to be assembled in a straightforward and therefore cost-effective manner. The work piece comprising the first set 14 of downstream cyclones 9*a* is simply inserted into the circle formed by the second set 15 of downstream cyclones 9*b*. Locating means in the form of fins 32 on the exterior surfaces of the downstream cyclones 9*a* of the first set 14 assist in locating the first set 14 of cyclones in a predetermined position and orientation with respect to the second set 15. The caps 18 are inserted into the larger openings 11*a*, 11*b* of the downstream cyclones 9*a*, 9*b*—this may be done before or after the first and second sets 14, 15 are brought together. The caps 18 are arranged so that the caps of type 18*a*, which have an internal channel 20 that extends helically clockwise, alternate with caps of type 18*b*, which have an internal channel that extends helically anti-clockwise. By arranging the cyclones in this way, the number of sharp corners in the apparatus is kept to a minimum. It is known that fluff and dust can accumulate on corners and other areas where there is a sharp turn in the airflow path. The caps 18*a* may be differently coloured from caps 18*b*, so that the assembly line operator immediately can discern the caps having clockwise channels from the caps having anti-clockwise channels. The seal 29 is then placed on top of the downstream cyclone assembly 8, followed by the lid 28.

Apertures in the seal 29 and lid 28 are manufactured so as to be in registration with the outlets 21 of the downstream cyclones 9*a*, 9*b*. The cyclone cover 27 and handle 31 are attached to the downstream cyclone assembly 8 by means of suitable fasteners.

The downstream cyclone assembly 8 is inserted into the upstream cyclone 2. The support ring 17 of the second set 15 of downstream cyclones sits against the upper edge of the shroud 7. The support ring 17 forms a sealing surface with the shroud 7 and reduces leakage of airflow between these components. The other end portion of the shroud 7 fits against the downstream collector 25, which, in turn, abuts the base 4 of the upstream cyclone.

Figure 6:
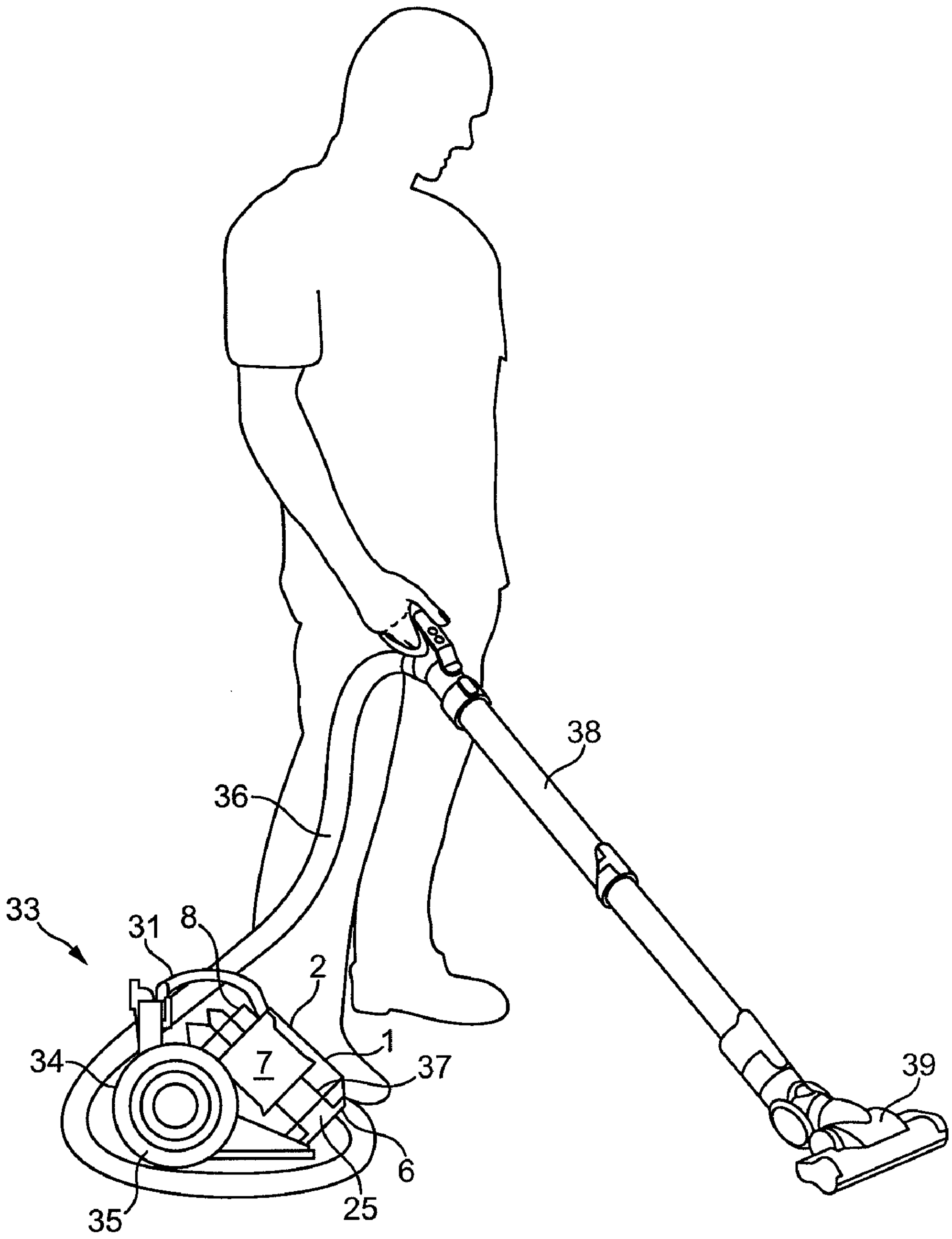
FIG. 6 is a perspective view of a vacuum cleaner employing the cyclonic separating apparatus of FIGS. 1 and 2 in use.

FIG. 6 shows the assembled cyclonic separating apparatus 1 in use in a domestic vacuum cleaner 33 of the cylinder type. The vacuum cleaner 33 has a main body 34 housing a motor and fan unit (not shown) and to which a pair of wheels 35 is attached. The wheels 35 allow the main body 34 of the vacuum cleaner 33 to be manoeuvred across a floor surface. The cyclonic separating apparatus 1 of the present invention is releasably attached to the main body 34. A flexible hose 36 is connectable to an inlet port 37 on the main body 34. The other end of the flexible hose 36 is connectable to a wand 38, the distal end of which is adapted to receive a floor tool 39.

During use, the main body 34 of the cleaner 33 is pulled along the floor surface by the flexible hose 36 as a user moves around a room. When the user switches on the vacuum cleaner 33, the motor is energized and drives a fan so as to draw in dirty air through the floor tool 39. The dirty air, carrying dirt and dust from the floor surface, is drawn through the wand hose 36 and wand 38 and into the cyclonic separating apparatus 1 via the inlet port 37. Dirt and dust is separated from the airflow by the cyclonic separating apparatus 1 and is retained in the collectors 6 and 25. The cleaned air then passes from the cyclonic separating apparatus 1, through a pre-motor filter (not shown), across the motor and fan unit for cooling and through a post-motor filter (not shown) before being ejected from the vacuum cleaner 33.

By utilising the present invention, a compact cyclone arrangement can be achieved, so that the appliance as a whole can be made to occupy a smaller volume than was possible hitherto. Further sets of downstream cyclones may be provided, either in series or in parallel, and arranged to have different angles of inclination from the first and second sets. Not all of the downstream cyclones of a set need be inclined at the same angle to the longitudinal axis of the cyclonic separator as a whole. Similarly, not all of the downstream cyclones of a set need have the same internal dimensions.

The appliance need not be a cylinder vacuum cleaner. The invention is applicable to other types of vacuum cleaner, for example, cylinder machines, stick-vacuums or hand-held cleaners. Further, the present invention is applicable to other types of cleaning appliances, for example, a wet and dry machine or a carpet shampooer, and surface-treating appliances in general—such as polishing/waxing machines, pressure washing machines, ground marking machines and lawn mowers.

The invention claimed is:

1. A cyclonic separating apparatus having a longitudinal axis and comprising an upstream cyclonic separator and a downstream cyclone assembly comprising a plurality of cyclones arranged in parallel with one another in first and second sets, at least some of the cyclones of the first set having a longitudinal axis inclined at a first angle to the longitudinal axis of the cyclonic separating apparatus, and at least some of the cyclones of the second set having a longitudinal axis inclined at a second angle to the longitudinal axis of the cyclonic separating apparatus, the second angle being greater than the first angle, wherein at least some of the cyclones of the downstream cyclone assembly have a cap inside the respective cyclone, the cap comprising: an inlet to the cyclone, an outlet for the cyclone and at least one planar baffle arranged to project radially inwardly from an interior surface of the outlet.

2. A cyclonic separating apparatus as claimed in claim 1, in which the inlet is arranged to locate in a slot in the respective cyclone.

3. A cyclonic separating apparatus as claimed in claim 1, in which the cap further comprises a helical channel in fluid communication with the inlet.

4. A cyclonic separating apparatus as claimed in claim 3, in which the helical channel is also in fluid communication with the interior of the cyclone in which the cap is located.

5. A cyclonic separating apparatus as claimed in claim 3, in which the helical channel extends in a clockwise direction.

6. A cyclonic separating apparatus as claimed in claim 4, in which the helical channel extends in a clockwise direction.

7. A cyclonic separating apparatus as claimed in claim 1, in which at least some of the cyclones of the downstream cyclone assembly have an opening that lies in a plane inclined at an angle to the longitudinal axis of the cyclonic separating apparatus.

8. A cyclonic separating apparatus as claimed in claim 7, in which all of the cyclones of the second set have an opening that lies in a plane inclined at an angle to the longitudinal axis of the cyclonic separating apparatus.

9. A cyclonic separating apparatus as claimed in any claim 1, further comprising a locating arrangement for locating one of the first and second sets with respect to the other in a predetermined position and/or orientation.

10. A cyclonic separating apparatus having a longitudinal axis and comprising an upstream cyclonic separator and a downstream cyclone assembly comprising a plurality of cyclones arranged in parallel with one another in first and second sets, at least some of the cyclones of the first set having a longitudinal axis inclined at a first angle to the longitudinal axis of the cyclonic separating apparatus, and at least some of the cyclones of the second set having a longitudinal axis inclined at a second angle to the longitudinal axis of the cyclonic separating apparatus, the second angle being greater than the first angle, wherein the cyclones of the second set at least partially surround the cyclones of the first set.

11. A method of manufacturing cyclonic separating apparatus having a longitudinal axis, and a downstream cyclone assembly comprising a plurality of cyclones arranged in parallel with one another, the method comprising; manufacturing a first component comprising a first set of cyclones, at least some of which have a longitudinal axis inclined at a first angle to the longitudinal axis of the assembled cyclonic separating apparatus; and manufacturing a second component comprising a second set of cyclones, at least some of which have a longitudinal axis inclined at a second angle to the longitudinal axis of the assembled cyclonic separating apparatus, the second angle being greater than the first angle.

12. A manufacturing method as claimed in claim 11, further comprising the step of assembling the first set with the second set by utilising a locating arrangement for locating the first component with respect to the second component in a predetermined position and/or orientation.

13. A manufacturing method as claimed in claim 11, further comprising the step of manufacturing a plurality of caps, each of which is arranged to fit inside a respective cyclone, each cap comprising an inlet to the cyclone.

14. A manufacturing method as claimed in claim 13, in which each inlet is arranged to locate in a slot in the respective cyclone.

15. A manufacturing method as claimed in claim 13, in which at least some of the caps are of a first type comprising a helical channel extending in a first rotational direction from the inlet.

16. A manufacturing method as claimed in claim 15, in which the others of the caps are of a second type comprising a helical channel extending in the opposite rotational direction from the inlet.

17. A manufacturing method as claimed in claim 16, in which the caps of the first and second types are of different colours.

18. A manufacturing method as claimed in claim 16, further comprising the step of inserting the caps inside the cyclones such that caps of the first type alternate with caps of the second type.

19. A manufacturing method as claimed in claim 13, in which at least some of the caps further comprise an outlet for a cyclone.

20. A manufacturing method as claimed in claim 19, in which at least some of the caps further comprise at least one planar baffle arranged to project radially inwardly from an interior surface of the outlet.

21. A manufacturing method as claimed in claim 13, further comprising the step of assembling the downstream cyclone assembly with an upstream cyclonic separator.

22. A cleaning appliance incorporating cyclonic separating apparatus as claimed in claim 1.

23. A cleaning appliance incorporating cyclonic separating apparatus manufactured by a method as claimed in claim 13.

* * * * *